UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

1.1'-DIANTHRAQUINONYL-2.2'-DIALDEHYDE BODIES AND PROCESS OF MAKING SUCH COMPOUNDS.

1,047,813. Specification of Letters Patent. Patented Dec. 17, 1912.

No Drawing. Application filed November 4, 1911. Serial No. 658,572.

*To all whom it may concern:*

Be it known that I, MAX HENRY ISLER, citizen of the Swiss Republic, residing at Mannheim, Germany, have invented new and useful Improvements in 1.1'-Dianthraquinonyl-2.2'-Dialdehyde Bodies and Processes of Making Such Compounds, of which the following is a specification.

I have discovered that I can produce 1.1'-dianthraquinonyl-2.2'-dialdehyde compounds of which the simplest representative possesses a constitution corresponding to the formula

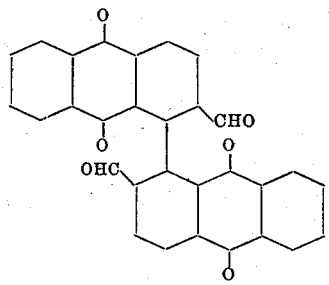

by treating omega-tetrahalogen-2.2'-dimethyl-1.1'-dianthraquinonyl compounds with concentrated sulfuric acid under which term I include also fuming sulfuric acid. In particular I can obtain nitro- or amino-1.1'-dianthraquinonyl-2.2'-dialdehyde compounds from the corresponding nitro- or amino-omega-tetrahalogen-2.2'-dimethyl-1.1'-dianthraquinonyl compounds. Such nitro- or amino-1.1'-dianthraquinonyl-2.2'-dialdehyde compounds are characterized by being difficultly soluble in the usual organic solvents in the cold, but more soluble on heating. They yield from yellow to brown solutions in concentrated sulfuric acid and give rise to from brown to brown-red vats in alkaline hydrosulfite and from these vats give rise to from brown to gray-violet shades on cotton.

The following examples will serve to illustrate further the nature of my invention and how it can be carried into practical effect, but the invention is not confined to these examples. The parts are by weight.

Example 1: Introduce 10 parts of nitro-omega-tetrachlor-2.2'-dimethyl-1.1'-dianthraquinonyl (obtainable by treating omega-tetrachlor-2.2'-dimethyl-1.1'-dianthraquinonyl with two molecular proportions of nitric acid in sulfuric acid solution) into 40 parts of 98% sulfuric acid, add 10 parts of anhydrous boric acid and heat the whole for 2 hours at from 125–130° C. The dialdehyde thus obtained yields a yellow solution in concentrated sulfuric acid, a brown-red solution in alkaline hydrosulfite, being thereby converted into a coloring matter which dyes cotton brown shades.

Example 2: Introduce 10 parts of amino-omega-tetrachlor-2.2'-dimethyl-1.1'-dianthraquinonyl (obtainable by reducing the nitro compound of Example 1 with sodium sulfid) into 40 parts of 98% sulfuric acid, add 10 parts of anhydrous boric acid and heat for 2 hours at 120° C. The aldehyde obtained yields a brown solution in concentrated sulfuric acid. In alkaline hydrosulfite it yields a brown-red vat, being thereby converted into a coloring matter which dyes cotton brown.

Example 3: Introduce 10 parts of nitro-omega-tetrachlor-2.2'-dimethyl-1.1'-dianthraquinonyl (obtainable by treating omega-tetrachlor-2.2'-dimethyl-1.1'-dianthraquinonyl with four molecular proportions of nitric acid in sulfuric acid solution) into 40 parts of 98% sulfuric acid, add 10 parts of anhydrous boric acid and heat for 2 hours at from 125–130° C. The dialdehyde thus obtained yields a brown-yellow solution in concentrated sulfuric acid. In alkaline hydrosulfite it yields a brown vat, being thereby converted into a coloring matter which dyes cotton gray-violet.

Now what I claim is:—

1. The process of producing a 1.1'-dianthraquinonyl-2.2'-dialdehyde body by treating an omega-tetrahalogen-2.2'-dimethyl-1.1'-dianthraquinonyl body with concentrated sulfuric acid.

2. The process of producing a 1.1'-dianthraquinonyl-2.2'-dialdehyde body, containing at least one group containing a nitrogen atom by treating with concentrated sulfuric acid an omega-tetrahalogen-2.2'-dimethyl-1.1'-dianthraquinonyl body containing at least one group containing a nitrogen atom.

3. The process of producing a nitrated 1.1'-dianthraquinonyl-2.2'-dialdehyde by treating with concentrated sulfuric acid a nitrated omega-tetrahalogen-2.2'-dimethyl-1.1'-dianthraquinonyl.

4. As new articles of manufacture 1.1'- dianthraquinonyl-2.2'-dialdehyde bodies containing at least one group containing a nitrogen atom, which compounds are difficultly soluble in the usual organic solvents in the cold, but are more soluble on heating, which yield from yellow to brown solutions in concentrated sulfuric acid, which yield from brown to brown-red vats in alkaline hydrosulfite, and which from these vats give rise to from brown to gray-violet shades on cotton.

5. As a new article of manufacture dinitro-1.1'-dianthraquinonyl-2.2'-dialdehyde which is difficultly soluble in the usual organic solvents in the cold, but is more soluble on heating, which yields a yellow solution in concentrated sulfuric acid, which yields a brown-red vat with alkaline hydrosulfite, and which from this vat gives rise to brown shades on cotton.

In testimony whereof I have hereunto set my hand in the presence of two subscribing witnesses.

MAX HENRY ISLER.

Witnesses:
J. ALEC. LLOYD,
JOSEPH F. CIPPER.

Copies of this patent may be obtained for five cents each, by addressing the "Commissioner of Patents, Washington, D. C."